United States Patent
Bartels et al.

(10) Patent No.: US 12,508,392 B2
(45) Date of Patent: Dec. 30, 2025

(54) ANESTHETIC DISPENSING DEVICE AND PROCESS FOR SETTING AN ANESTHETIC CONCENTRATION

(71) Applicant: Drägerwerk AG & Co. KGaA, Lübeck (DE)

(72) Inventors: Uwe Bartels, Lübeck (DE); Norbert Wruck, Lübeck (DE)

(73) Assignee: DRÄGERWERK AG & CO. KGAA, Lübeck (DE)

( * ) Notice: Subject to any disclaimer, the term of this patent is extended or adjusted under 35 U.S.C. 154(b) by 1284 days.

(21) Appl. No.: 17/149,895

(22) Filed: Jan. 15, 2021

(65) Prior Publication Data

US 2021/0220603 A1   Jul. 22, 2021

(30) Foreign Application Priority Data

Jan. 17, 2020   (DE) ................... 10 2020 000 267.6

(51) Int. Cl.
*A61M 16/18*   (2006.01)
*A61M 16/00*   (2006.01)
(Continued)

(52) U.S. Cl.
CPC ........ *A61M 16/18* (2013.01); *A61M 16/0003* (2014.02); *A61M 16/022* (2017.08);
(Continued)

(58) Field of Classification Search
CPC .. A61M 2016/0027; A61M 2016/1035; A61M 2205/3368; A61M 16/10;
(Continued)

(56) References Cited

U.S. PATENT DOCUMENTS 4,770,168 A      9/1988   Rusz
5,967,141 A  *  10/1999   Heinonen ............. A61M 16/18
                                                    128/203.14
(Continued)

FOREIGN PATENT DOCUMENTS

CN   201058168 Y   5/2008
CN   101683544 A   3/2010
(Continued)

*Primary Examiner* — LaToya M Louis (74) *Attorney, Agent, or Firm* — McGlew and Tuttle, P.C.

(57) ABSTRACT

An anesthetic dispensing device includes a first gas branch carrying breathing gas through an anesthetic evaporator to a mixer unit. A second gas branch carries breathing gas to the mixer unit. A proportional valve in the second gas branch receives a valve control signal to set a valve opening. A control unit determines a first gas branch flow and a second gas branch flow and a desired chamber pressure of an evaporator chamber of the anesthetic evaporator based on a predefined desired concentration and the branch flows. The control unit determines a desired valve opening of the proportional valve as a function of the desired chamber pressure and to output this as a valve control signal. The desired valve opening is determined such that the desired chamber pressure within the anesthetic dispensing device is reached in the first gas branch due to the desired valve opening.

20 Claims, 6 Drawing Sheets

(51) Int. Cl.
*A61M 16/20* (2006.01)
*A61M 16/10* (2006.01)

(52) U.S. Cl.
CPC ... *A61M 16/201* (2014.02); *A61M 2016/0027* (2013.01); *A61M 2016/1035* (2013.01); *A61M 2205/3368* (2013.01)

(58) Field of Classification Search
CPC .... A61M 16/14; A61M 16/18; A61M 16/104; A61M 16/0003; A61M 16/20; A61M 16/201; A61M 16/022
See application file for complete search history.

(56) References Cited

U.S. PATENT DOCUMENTS

| | | | | |
|---|---|---|---|---|
| 8,365,724 | B2* | 2/2013 | Bottom | A61M 16/18 128/203.14 |
| 11,079,774 | B2* | 8/2021 | Sugita | G05D 7/0647 |
| 2014/0083420 | A1* | 3/2014 | Robel | A61M 16/1075 128/203.14 |
| 2015/0320953 | A1* | 11/2015 | Acker | A61M 16/201 128/203.14 |
| 2019/0099581 | A1 | 4/2019 | Kuzelka | |
| 2019/0151584 | A1 | 5/2019 | Kuck et al. | |

FOREIGN PATENT DOCUMENTS

| | | | | |
|---|---|---|---|---|
| CN | 201840751 | U | 5/2011 | |
| CN | 105749400 | A | 7/2016 | |
| CN | 106456928 | A | 2/2017 | |
| DE | 3632698 | A1 | 3/1988 | |
| DE | 4105971 | A1 | 8/1992 | |
| DE | 69208836 | T2 | 10/1996 | |
| DE | 69208836 | T3 | 4/2000 | |
| EP | 0264554 | A1 | 4/1988 | |
| EP | 0545567 | A1 | 6/1993 | |
| EP | 0722748 | A2 | 7/1996 | |
| FI | 950289 | A | 7/1996 | |
| WO | 2009062540 | A1 | 5/2009 | |
| WO | WO-2019187191 | A1 * | 10/2019 | A61M 13/006 |

* cited by examiner

ANESTHETIC DISPENSING DEVICE AND PROCESS FOR SETTING AN ANESTHETIC CONCENTRATION

CROSS REFERENCE TO RELATED APPLICATIONS

This application claims the benefit of priority under 35 U.S.C. § 119 of German Application 10 2020 000 267.6, filed Jan. 17, 2020, the entire contents of which are incorporated herein by reference.

TECHNICAL FIELD

The present invention pertains to an anesthetic dispensing device for setting an anesthetic concentration in a gas mixture to be made available to an anesthesia breathing circuit. The present invention further pertains to a process for setting an anesthetic concentration in a gas mixture to be made available to an anesthesia breathing circuit.

TECHNICAL BACKGROUND

The use of an anesthetic dispensing device for enriching a breathing gas that is made available with an anesthetic and for outputting a gas mixture enriched in this manner to an anesthesia breathing circuit connected to a patient is known. A first gas branch with an anesthetic evaporator is typically used here in order to enrich the breathing gas fed with the anesthetic. Furthermore, a second gas branch, also called bypass branch, is typically led past the anesthetic evaporator in order to make available a diluted gas mixture, which is enriched with the anesthetic, within the framework of feeding both gas branches to a mixer unit.

The dispensing is typically carried out here via an especially precise control of the anesthetic evaporator.

For controlling this dispensing, it is proposed in U.S. Pat. No. 5,967,141 that the anesthetic concentration be determined at an outlet of the anesthetic dispensing device and that the dispensing be changed by controlling the gas flow through the gas branches if the anesthetic concentration determined does not agree with a predefined desired concentration.

SUMMARY

An object of the present invention is to make possible an improved setting of the anesthetic concentration, especially a particularly simple setting of the anesthetic concentration, which can be automated easily.

An anesthetic dispensing device for setting an anesthetic concentration in a gas mixture to be made available to an anesthesia breathing circuit, with a first gas branch, with a second gas branch, with an anesthetic evaporator, with a mixer unit, with a first gas flow measuring unit, with a proportional valve, with a pressure measuring unit and with a control unit, is proposed according to the present invention for accomplishing this object.

The first gas branch can be connected to a breathing gas feed, especially to a breathing gas feed to which pressure can be admitted, and it is configured to carry a breathing gas through the anesthetic evaporator to the mixer unit.

The second gas branch can be connected to the breathing gas feed, especially to the breathing gas feed to which pressure can be admitted, and is configured to carry the breathing gas directly to the mixer unit.

The anesthetic evaporator is arranged and configured to enrich the breathing gas in the first gas branch with an anesthetic, especially with a volatile anesthetic.

The mixer unit is arranged and configured to mix the breathing gas enriched with the anesthetic from the first gas branch with the breathing gas from the second gas branch and to make the gas mixture formed thereby available to an outlet of the anesthetic dispensing device.

The first gas flow measuring unit is configured to measure a first gas flow and to output a corresponding first gas flow signal.

The proportional valve is arranged in the second gas branch and is configured to receive a valve control signal and to set a valve opening corresponding to the valve control signal.

The pressure measuring unit is arranged and configured to measure a gas pressure within the second gas branch and to output a corresponding valve pressure signal.

The control unit is configured to receive the valve pressure signal, the first gas flow signal and a second gas flow signal and to determine a first gas branch flow in the first gas branch and a second gas branch flow in the second gas branch as a function of the first and second gas flow signals. Furthermore, the control unit is configured to receive a desired concentration signal, which indicates a predefined desired concentration of the anesthetic at the outlet, and to determine a desired chamber pressure of an evaporator chamber of the anesthetic evaporator on the basis of the predefined desired concentration and the first and second gas branch flows. Finally, the control unit is further configured to determine a desired valve opening of the proportional valve as a function of the desired chamber pressure and the valve pressure signal, the desired valve opening being determined such that the desired chamber pressure within the anesthetic dispensing device is reached in the first gas branch due to the desired valve opening of the proportional valve in the second gas branch. Furthermore, the control unit is configured to output the valve control signal indicating the desired valve opening to the proportional valve.

It was found within the framework of the present invention that the chamber pressure within the evaporator chamber of the anesthetic evaporator can be set via a proportional valve in the second gas branch, i.e., in the bypass branch, and the resulting anesthetic concentration can be controlled thereby. Furthermore, it was found that a complicated separate flow control between the first and second gas branches can be avoided by such a control of a proportional valve.

The anesthetic dispensing device according to the present invention advantageously ensures the predefined desired concentration of the anesthetic by influencing the gas pressure within the first and second gas branches. As a result, especially robust and cost-effective parts, for example, the proportional valve or the pressure measuring unit, can be used for setting the anesthetic concentration.

Only a few parts need advantageously to be changed or adapted in the anesthetic dispensing device according to the present invention compared to prior-art and already commercially available dispensing devices.

Furthermore, the regular measurement of the gas pressure within the second gas branch makes it possible to rapidly detect known sources of interference, e.g., a leak. Furthermore, monitoring of the gas pressure also makes it possible to ensure a minimum and/or maximum pressure within the dispensing device in order to carry, for example, the breathing gas being fed, to which pressure has been admitted, through the two gas branches in a controlled manner.

Another advantage of the anesthetic dispensing device according to the present invention is that an especially wide range of different predefined desired concentrations of the anesthetic can be set via the proportional valve. In particular, a high concentration at which the anesthetic is released can be made available despite a lightweight anesthetic evaporator, because a change in concentration is possible without influencing the temperature of the evaporator chamber. It is therefore unnecessary to maintain the temperature at a constant value in a complicated manner by means of a large mass of the evaporator chamber. The temperature present in the evaporator chamber is preferably a predefined temperature. Furthermore, the evaporator chamber may have a temperature sensor, which is configured to output a temperature signal indicating the temperature to the control unit. The control unit according to the present invention uses the temperature of the evaporator chamber in order to determine the desired chamber pressure in the evaporator chamber and/or the desired valve opening.

The approach according to the present invention, namely, the setting of the anesthetic concentration via the gas pressure within the first gas branch, is based on the fact that the percentage of substance within the evaporator chamber and hence the concentration at which the anesthetic is released are influenced in a specific manner by the gas pressure within the first gas branch. Since the partial pressure of a volatile liquid depends essentially only on the temperature, this is a fixed value at a predefined and/or known evaporator chamber temperature. However, an absolute pressure within the evaporator chamber is changed according to the present invention corresponding to the desired chamber pressure. For example, a reduction in the percentage of the anesthetic vapor within the evaporator chamber by the factor of two is associated with an increase in the absolute pressure by the factor two at constant temperature, so that the anesthetic concentration can be set within the evaporator chamber by controlling the absolute pressure.

Various known volatile anesthetics, for example, isoflurane, sevoflurane and desflurane, may advantageously be used for the anesthetic dispensing device according to the present invention.

The predefined desired concentration is predefined, for example, by a manual input or by an anesthesia device connected to the anesthesia breathing circuit.

The pressure measuring unit may be, for example, a differential pressure measuring device. Furthermore, the pressure measuring unit may be a part of a pressure measuring system of the anesthetic dispensing device according to the present invention.

The control unit may be arranged separated in space from the other parts of the anesthetic dispensing device. In particular, the control unit may comprise a processor of a medical device. The control unit may comprise, furthermore, different control modules, especially control modules separated in space. All parts of the anesthetic dispensing device according to the present invention may be arranged in a common housing or they may also be arranged at least partially at spaced locations from one another. In particular, the anesthetic dispensing device according to the present invention may be used and arranged separately from an anesthesia device for operating the anesthesia breathing circuit.

The anesthetic dispensing device is preferably complemented by an additional sensor system, which checks whether a gas mixture with the predefined desired concentration is present at the outlet.

According to the present invention, the desired valve opening of the proportional valve is a position of the proportional valve that indicates how much gas can pass through the proportional valve. The valve control signal may indicate, for example, the concrete desired valve opening or a change, especially an incremental change, in the currently present valve opening. Thus, a sequence of a plurality of valve control signals may be necessary according to the present invention in order to reach a defined desired valve opening of the proportional valve, especially to reach it gradually. The desired valve opening may be indicated according to the present invention, for example, by indicating a desired valve effect to be set, e.g., a desired pressure drop and/or a desired volume flow and/or a desired mass flow. In some embodiments according to the present invention, the opening of the proportional valve, i.e., the position of a movable part of the proportional valve, is not determined and predefined directly, but the flow opening for the gas, which opening is formed by the movable part, is set by setting the desired pressure drop, the desired volume flow and/or the desired mass flow and a desired valve opening is indicated or predefined thereby.

Within the framework of the present invention, a valve is generally a flow regulating element, which regulates a flow of a fluid on the basis of the position of a movable part of the valve and by a corresponding regulation of the flow opening.

The configuration of an anesthetic evaporator, of a mixer unit and of a proportional valve are known, in principle, to the person skilled in the art, so that this will not be explained in detail below. Furthermore, various embodiments of a gas flow measuring unit and of a pressure measuring unit are likewise known to the person skilled in the art in this field, so that possible prior-art structures for such measuring units will likewise not be explained in detail below.

Within the framework of the present invention, the determination of a value on the basis of predefined information is a determination of the value by direct use of the predefined information and/or by the use of information that is available on the basis of the predefined information. The determination based on and/or depending on predefined information may also be carried out with the use of additional information during this determination.

Preferred embodiments of the system according to the present invention will be described below.

In an especially preferred embodiment, the anesthetic dispensing device according to the present invention comprises, furthermore, a second gas flow measuring unit, which is configured to determine a second gas flow and to output the second gas flow signal on the basis of the second gas flow. A ratio of the gas flow in the first gas branch to the gas flow in the second gas branch can be inferred directly due to the two gas flow measuring units in this embodiment. Furthermore, the second gas flow signal is preferably measured in this embodiment at least at regular intervals, especially continuously. In an alternative embodiment, the anesthetic dispensing device is configured to receive the second gas flow signal from an external device and/or to use a predefined second gas flow signal for the processing by the control unit.

In a preferred variant of the preceding embodiment, the first gas flow measuring unit is arranged in the first gas branch and the second gas flow measuring unit is arranged in the second gas branch. The flow in the first gas branch and the flow in the second gas branch can preferably be measured directly in this variant in order to infer the desired chamber pressure within the evaporator chamber from the ratio of the two flows in relation to one another, which ratio results from this, and from the predefined desired concentration. Furthermore, the direct measurement of the two flows according to this variant reduces the risk of measurement errors, which would occur in case of an indirect measurement of at least one of the two flows. Thus, one of the two gas flow measuring units is arranged in the area of the breathing gas feed in an alternative variant of this embodiment, so that the flow in the corresponding other gas branch can also be determined by a known flow within one gas branch and by the overall flow in the area of the breathing gas feed.

In another embodiment, the first gas flow measuring unit and/or the second gas flow measuring unit comprise a differential pressure sensor. A differential pressure sensor is a prior-art type of sensor manufactured in large quantities, so that it can be used in a cost-effective manner. The configuration of such a differential pressure sensor is generally known, so that it will not be explained in detail below. The use of a differential pressure sensor is especially accurate compared to a sensor that measures a single pressure at only one position. In one variant of this embodiment, the pressure measuring unit within the second gas branch is a part of the second gas flow measuring unit, which is formed by a differential pressure sensor within the second gas branch.

In another preferred embodiment, the pressure measuring unit is arranged at least partially in front of the proportional valve relative to the flow direction. Such an arrangement of the pressure measuring unit makes possible an especially precise determination of the pressure caused by the proportional valve within the second gas branch.

In an advantageous variant of the above embodiment, the pressure measuring unit is configured, furthermore, to measure the gas pressure within the second gas branch behind the proportional valve relative to the flow direction. The effect of the proportional valve on the gas pressure within the second gas branch can be checked especially precisely in this embodiment. The pressure drop caused by the proportional valve can be determined especially precisely and it can be used for further calculation during the determination of the desired chamber pressure and/or of the desired valve opening. The pressure drop caused by the proportional valve is preferably in a range between 200 mbar and 2,000 mbar.

In an especially preferred embodiment, the anesthetic dispensing device according to the present invention has an additional valve, which is arranged behind the anesthetic evaporator in the first gas branch relative to the flow direction and which is configured to receive an additional valve control signal and to set an additional valve opening corresponding to the additional valve control signal. The desired chamber pressure within the evaporator chamber can be reached via the control of the gas pressure within the two gas branches especially effectively by controlling the proportional valve in the second gas branch and the additional valve in the first gas branch. The flows in the two gas branches can be set separately by the additional valve, so that any desired ratio of the two flows can be set. This leads to a degree of freedom concerning the absolute pressure in the evaporator chamber that can thus be set almost as desired.

The additional valve is a closing valve, which is actuated in a pulse-pause mode, in the variant according to the present invention, and it is a valve embodied by a plastic that can be bent by admitting pressure in another variant. In an especially preferred variant of the preceding variant, the additional valve is a proportional valve. A proportional valve can be used especially simply and cost-effectively to control the gas pressure within the first gas branch.

In another, especially preferred embodiment, the valve control signal is provided such that a predefined minimum pressure is not fallen below within the evaporator chamber of the anesthetic dispensing device. By providing a minimum pressure, it can be ensured that the typically occurring pressure fluctuations in the downstream breathing circuit have no effect or only a slight effect on the accuracy of the anesthetic concentration set at the outlet of the anesthetic dispensing device. Thus, an excessively low pressure within the two gas branches would cause the pressure fluctuations in the breathing circuit to interfere with the constancy of flow in the anesthetic evaporator. In a preferred variant of this embodiment, the valve control signal is provided such that the predefined minimum pressure is at least 200 mbar and especially at least 300 mbar.

In a preferred embodiment, the anesthetic dispensing device has, furthermore, a concentration measuring unit, which is arranged between the mixer unit and the outlet and is configured to determine a current concentration of the anesthetic and to output a corresponding concentration signal, wherein the control unit is further configured to receive the concentration signal and to determine the desired valve opening as a function of the current concentration indicated by the concentration signal. It is ensured in this embodiment in an especially reliable manner that the anesthetic concentration at the outlet of the anesthetic dispensing device corresponds to the predefined desired concentration of the anesthetic. When controlling the desired valve opening of the proportional valve, it is thus also possible to take into consideration the actually present anesthetic concentration at the outlet in addition to the absolute pressure derived on the basis of the flows in the gas branches within the evaporator chamber. In an especially preferred variant of this embodiment, the anesthetic dispensing device has, furthermore, the additional valve in the first gas branch. In addition to the sensor system at the outlet, it is also possible as a result to provide an especially reliable actuator mechanism, by which the detected deviations in the anesthetic concentration can be corrected.

In another preferred embodiment, the anesthetic dispensing device has, furthermore, an additional pressure measuring unit, which is configured to measure the gas pressure within the first gas branch behind the anesthetic evaporator relative to the flow direction. The absolute pressure of the breathing gas enriched with the anesthetic can be determined hereby, as a result of which a current concentration of the anesthetic in the breathing gas can be determined especially accurately by means of prior-art methods.

In another preferred variant of the above embodiment, the concentration measuring unit has at least one concentration measuring module, which is configured to determine the concentration of the anesthetic in the gas mixture on the basis of a thermal conductivity measurement and/or of an electrochemical measurement. The concentration measuring unit is preferably configured here to determine within the framework of the thermal conductivity measurement and/or the electrochemical measurement both a measured value, especially a temperature, in the area of the outlet, and a measured value, especially a temperature, in the area of the second gas branch. Based on such a comparative measurement, it is possible to infer the anesthetic concentration using, for example, the prior-art thermal conductivity of common gas mixtures used as breathing gas, such as an oxygen-nitrogen mixture and/or an oxygen-laughing gas mixture. An especially cost-effective thermal conductivity sensor, which can be provided in a simple manner, can advantageously be used in this variant.

In another preferred variant of the above embodiment, the control unit is configured to determine the desired valve opening as a function of a difference between the current concentration and a predefined desired concentration. The information obtained additionally by the concentration measuring unit concerning the currently present anesthetic concentration at the outlet is used in this variant for the especially precise setting of the proportional valve.

In another embodiment, the control unit is configured to receive a fresh gas signal, which indicates a predefined fresh gas flow of the gas mixture, which fresh gas flow is to be made available at the outlet, and wherein the control unit is further configured to determine the desired valve opening and/or the desired chamber pressure as a function of the predefined fresh gas flow. The gas mixture added to the anesthesia breathing circuit by the anesthetic dispensing device is called the fresh gas here. In an especially preferred variant of this embodiment, the anesthetic dispensing device has, furthermore, the additional valve, especially the additional proportional valve, in the first gas branch. The breathing gas flow can be set in this variant especially directly by the two valves in the first and second gas branches corresponding to the fresh gas flow to be provided. For example, the fresh gas flow can be increased at the outlet at constant anesthetic concentration by reducing the percentage of fresh gas from the second gas branch, so that an uptake of anesthetic in the first gas branch, which uptake is reduced by the increased flow, leads to a constant anesthetic concentration in the gas mixture formed after passage through the mixer unit. Both the proportional valve in the second gas branch and the additional valve in the first gas branch are used in this scenario to provide the predefined fresh gas flow. The provision of different values for the fresh gas flow may preferably be set in a range between 0.5 L/minute and 20 L/minute. The concentration ranges that can be set depend on the anesthetic being used.

In another embodiment, at least one of the proportional valves is configured to output a valve opening signal, which indicates the currently present valve opening of the proportional valve in question. The control unit is preferably configured in a variant of this exemplary embodiment to receive the valve opening signal and to use it when generating the valve control signal.

In another especially preferred embodiment, the anesthetic evaporator has, furthermore, a temperature measuring unit, which is configured to determine a temperature within the evaporator chamber of the anesthetic evaporator and to output a temperature signal, which indicates the temperature present within the evaporator chamber. The control unit is preferably configured in a variant of this embodiment to receive the temperature signal and to determine, furthermore, the desired chamber pressure and/or the desired valve opening as a function of the temperature signal. It is advantageously possible as a result to respond to a change in the temperature within the evaporator chamber and to a resulting change therefrom in the ratio of the partial pressure of the anesthetic and of the absolute pressure in the evaporator chamber. This makes it possible to provide the predefined desired concentration of the anesthetic especially precisely. In an alternative embodiment, the anesthetic evaporator is configured to provide a constant, predefined temperature within the evaporator chamber.

According to another aspect of the present invention, a process for setting an anesthetic concentration in a gas mixture to be made available to an anesthesia breathing circuit is proposed to accomplish the above-mentioned object. The process has the following steps:

provision of a first gas branch and of a second gas branch, wherein the first gas branch can be connected to a breathing gas feed and is configured to carry a breathing gas through an anesthetic evaporator to a mixer unit, and wherein the second gas branch can be connected to the breathing gas feed and is configured to carry the breathing gas directly to the mixer unit, and wherein the mixer unit is arranged and configured to mix the breathing gas from the first gas branch, which breathing gas is enriched with an anesthetic, with the breathing gas from the second gas branch, and to make the gas mixture formed thereby available to an outlet of the anesthetic dispensing device;

receipt of a valve control signal and setting of a valve opening of a proportional valve corresponding to the valve control signal;

measurement of a first gas flow and outputting of a corresponding first gas flow signal;

measurement of a gas pressure within the second gas branch and outputting of a corresponding valve pressure signal;

receipt of the first gas flow signal and of a second gas flow signal and determining a first gas branch flow in the first gas branch and of a second gas branch flow in the second gas branch as a function of the first and second gas flow signals;

receipt of a desired concentration signal, which indicates a predefined desired concentration of the anesthetic at the outlet, and determination of a desired chamber pressure of an evaporator chamber of the anesthetic evaporator on the basis of at least the predefined desired concentration and the first and second gas branch flows;

determination of a desired valve opening of the proportional valve as a function of the desired chamber pressure and of the valve pressure signal, wherein the desired valve opening is determined such that the desired chamber pressure within the anesthetic evaporator is reached in the first gas branch due to the desired valve opening of the proportional valve in the second gas branch; and outputting of the valve control signal indicating the desired valve opening to the proportional valve.

The process according to the additional aspect of the present invention advantageously makes possible an especially simple control of the anesthetic concentration made available to the anesthesia breathing circuit. Furthermore, the process according to the present invention can be automated in an especially simple manner. Thus, depending on the predefined desired concentration, the anesthetic concentration within the first gas branch can be set reliably by regulating the proportional valve as a function of the desired chamber pressure within the evaporator chamber and therefore as a function of the absolute pressure within the evaporator chamber.

The process according to the present invention is an iterative process. While the first step of providing parts is typically carried out during the manufacture of the anesthetic dispensing device, the valve opening of the proportional valve is set iteratively at regular intervals. Thus, following a setting of the valve opening, the gas pressure continues to be measured within the second gas branch, as a result of which the desired chamber pressure continues to be set depending on the current measured values within the anesthetic dispensing device, and the desired valve opening is determined as a function of the desired chamber pressure and is outputted as a new valve control signal.

In an especially advantageous embodiment of the process according to the present invention, the process further comprises the steps of
providing of an additional valve, which is arranged in the first gas branch behind the anesthetic evaporator relative to the flow direction; and
receipt of an additional valve control signal and setting of an additional valve opening of the additional valve corresponding to the additional valve control signal. By setting the proportional valve in the second gas branch and the additional valve in a first gas branch, the desired chamber pressure within the evaporator chamber of the anesthetic evaporator can be set especially reliably.

In another, especially preferred embodiment of the process according to the present invention, the anesthetic evaporator has, furthermore, a temperature measuring unit, which is configured to determine a temperature within the evaporator chamber of the anesthetic evaporator and to output a temperature signal, which indicates the temperature present within the evaporator chamber. The process preferably comprises, furthermore, the following steps:
receipt of the temperature signal; and
furthermore, determination of the desired chamber pressure as a function of the temperature signal.

The present invention will be explained in more detail now on the basis of advantageous exemplary embodiments shown schematically in the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
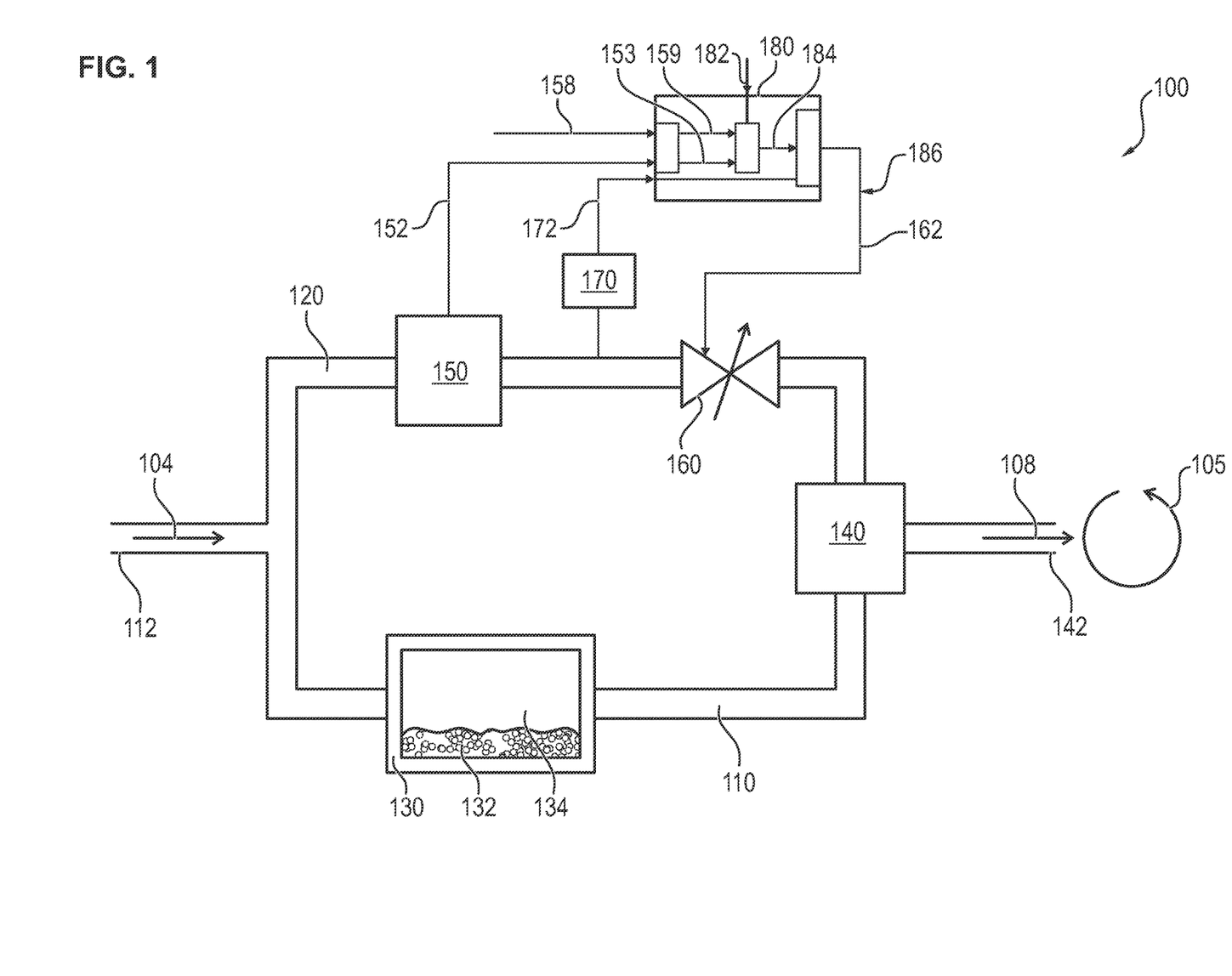
FIG. 1 is a schematic view of a first exemplary embodiment of an anesthetic dispensing device according to the present invention.

Referring to the drawings, FIG. 1 shows a schematic view of a first exemplary embodiment of an anesthetic dispensing device 100 according to the present invention.

The anesthetic dispensing device 100 is configured to set an anesthetic concentration in a gas mixture 108 to be made available to an anesthesia breathing circuit 105, with a first gas branch 110, with a second gas branch 120, with an anesthetic evaporator 130, with a mixer unit 140, with a first gas flow measuring unit 150, with a proportional valve 160, with a first pressure measuring unit 170 and with a control unit 180.

The first gas branch 110 can be connected to a breathing gas feed 112 and is configured to carry a breathing gas 104 through the anesthetic evaporator 130 to the mixer unit 140.

The second gas branch 120 can be connected to the breathing gas supply and is configured to carry the breathing gas 104 directly to the mixer unit 140. The two gas branches 110, 120 have a cavity each, through which the breathing gas 104 is carried and which is defined by a tubular wall.

The anesthetic evaporator 130 is arranged and configured to enrich the breathing gas 104 in the first gas branch 110 with an anesthetic 132. The anesthetic 132 is preferably present for this purpose in an evaporator chamber 134. The anesthetic 132 within the evaporator chamber 134 is typically present in both the liquid form and in the gaseous form. The structure of such an evaporator chamber is generally known and will not therefore be explained in detail below.

The mixer unit 140 is arranged and configured to mix the breathing gas 104 enriched with the anesthetic 132 from the first gas branch 110 with the breathing gas 104 from the second gas branch 120 and to make the gas mixture 108 formed thereby available to an outlet 142 of the anesthetic dispensing device 100. The mixer unit 140 is arranged at a spaced location from the outlet 142 in the exemplary embodiment shown. In one exemplary embodiment, not shown, the mixer unit comprises the outlet of the anesthetic dispensing device.

The first gas flow measuring unit 150 is configured to measure a first gas flow and to output a corresponding first gas flow signal 152. The first gas flow measuring unit 150 is arranged in this case in the second gas branch 120 and it measures the gas flow through the second gas branch 120 directly. The first gas flow signal 152 therefore indicates directly the gas flow through the second gas branch 120. In the exemplary embodiment shown, the gas flow measuring unit 150 is a differential pressure sensor with a throttling unit. In one exemplary embodiment, not shown, the first gas flow measuring unit is formed by an ultrasonic flow sensor, by a magnetic inductive flow sensor and/or by a flow sensor having another prior-art configuration.

The proportional valve 160 is arranged in the second gas branch and is configured to receive a valve control signal 162 and to set a valve opening corresponding to the valve control signal 162. The configuration of such a proportional valve is known to the person skilled in the art in this field and it will not therefore be explained in detail below.

The pressure measuring unit 170 is arranged and configured to measure a gas pressure within the second gas branch 120 and to output a corresponding valve opening pressure 172. The pressure measuring unit 170 is configured here especially to measure the gas pressure in front of the proportional valve 160 relative to the flow direction. The pressure measuring unit 170 is an absolute pressure sensor in this case, which measures an occurring absolute pressure within the second gas branch 120.

The control unit 180 is configured to receive the valve pressure signal 172, the first gas flow signal 152 and a second gas flow signal 158 and to determine a first gas branch flow 159 in the first gas branch 110 and a second gas branch flow 153 in the second gas branch 120 as a function of the first and second gas flow signals 152, 158. The first gas flow signal 152 already indicates the second gas branch flow 153 in the second gas branch 120, because the first gas flow measuring unit 150 is arranged in the second gas branch 120. In one exemplary embodiment, not shown, the first gas flow measuring unit is arranged in the first gas branch or in the area of the breathing gas feed, so that the second gas branch flow in the second gas branch can only be inferred indirectly, for example, by a ratio to another measured gas flow. The second gas flow signal 158 is provided by an additional measuring unit, not shown in FIG. 1, and/or it is made available as a predefined second gas flow signal characterizing the breathing gas feed. Furthermore, the control unit 180 is configured to receive a desired concentration signal 182, which indicates a predefined desired concentration of the anesthetic at the outlet 142 and to determine a desired chamber pressure 184 of the evaporator chamber 134 of the anesthetic evaporator 130 on the basis of the predefined desired concentration and the first and second gas branch flows 153, 159. In the exemplary embodiment according to the present invention shown, the anesthetic concentration is set at the outlet 142 corresponding to the predefined desired concentration by setting the pressure within the evaporator chamber 134. The control unit 180 is further configured here to determine a desired valve opening 186 of the proportional valve 160 depending on the desired chamber pressure 184 and the valve pressure signal 172, wherein the desired valve opening 186 is determined such that the desired chamber pressure 184 within the anesthetic evaporator 130 is reached in the first gas branch 110 due to the desired valve opening 186 of the proportional valve 160. Consequently, so much or so little breathing gas 104 is dammed up via the proportional valve 160 that the absolute pressure within the evaporator chamber 134 corresponds to the determined desired chamber pressure 184. Depending on the gas flow through the evaporator chamber 134 and the temperature within the evaporator chamber 134, which is preferably maintained at a constant value at a predefined temperature in the exemplary embodiment being shown, the anesthetic concentration in the gas leaving the evaporator chamber 134 can be set hereby. Due to the concentration of the anesthetic being set on the basis of the gas pressure of the breathing gas 104 fed rather than on the basis of the temperature of the evaporator chamber 134, it is possible to change the anesthetic concentration especially rapidly. The gas pressure can typically be changed and maintained at a constant pressure within the evaporator chamber 134 markedly more rapidly and more simply than can the temperature.

Finally, the control unit 180 is configured, furthermore, to output the valve control signal 162 indicating the desired valve opening 186 to the proportional valve 160. The valve opening of the proportional valve 160 is brought by means of this valve control signal 162, at least incrementally, preferably directly, to the desired valve opening 186. Furthermore, a control of the proportional valve 160 by the control unit 180 is made possible according to the present invention via the first gas flow measuring unit 150 and via the pressure measuring unit 170 for the valve opening resulting therefrom. Should the desired chamber pressure 184 already be present within the evaporator chamber 134, no valve control signal 162 is outputted or a valve control signal 162 that indicates the current valve opening as the desired valve opening 186 is outputted.

The control unit 180 is preferably configured in the exemplary embodiment shown to provide the valve control signal 162 such that a predefined minimum pressure within the evaporator chamber 134 of the anesthetic evaporator 130 is not fallen below. The predefined minimum pressure equals, for example, at least 200 mbar, especially at least 300 mbar. In another embodiment, the minimum pressure within the evaporator chamber depends on the mass flow of the breathing gas 104.

In one exemplary embodiment, not shown, an additional pressure measuring unit is arranged in the first gas branch. The additional pressure measuring unit is preferably arranged behind the anesthetic evaporator relative to the flow direction.

The different parts of the anesthetic dispensing device 100 according to the present invention are arranged in the exemplary embodiment shown in a common housing (not shown), which can be connected to the anesthesia breathing circuit 105. In another exemplary embodiment, the anesthetic dispensing device according to the present invention is integrated into an anesthesia device with a corresponding anesthesia breathing circuit. In another exemplary embodiment, the different parts of the anesthetic dispensing device according to the present invention are arranged at least partially in different housings.

Figure 2:
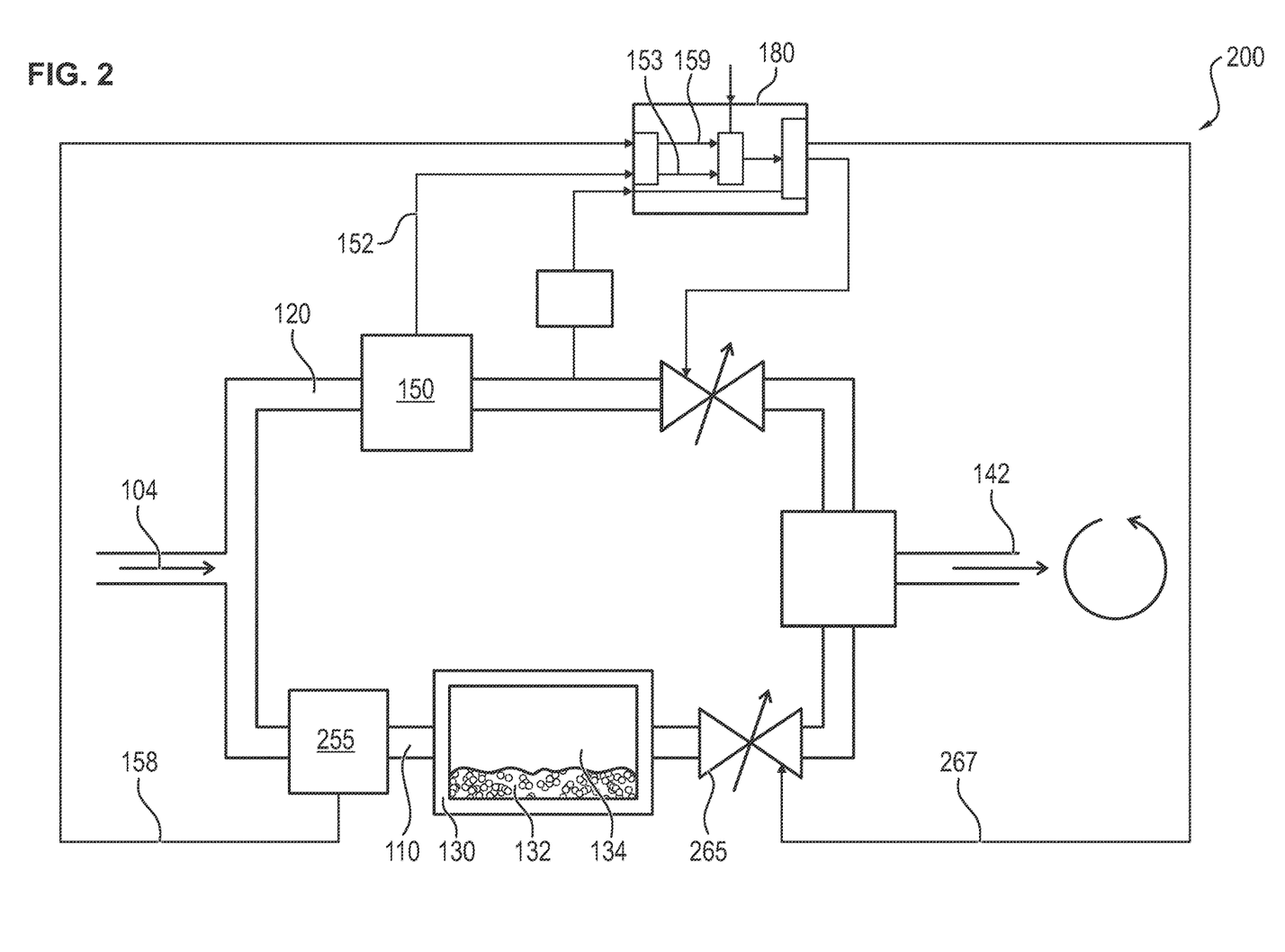
FIG. 2 is a schematic view of a second exemplary embodiment of the anesthetic dispensing device according to the present invention.

FIG. 2 shows a schematic view of a second exemplary embodiment of the anesthetic dispensing device 200 according to the present invention.

The anesthetic dispensing device 200 differs from the anesthetic dispensing device 100 shown in FIG. 1 in that it additionally has a second gas flow measuring unit 255, which is configured to determine the gas flow within the first gas branch 110 and to output the second gas flow signal 158 on the basis of this gas flow. The second gas flow measuring unit 255 is configured here as a differential pressure sensor. In one exemplary embodiment, not shown, the second gas flow measuring unit is an ultrasonic flow sensor or a magnetic inductive flow sensor. Due to the arrangement of the two gas flow measuring units 150, 255, the flows of the breathing gas 104 are outputted directly within the two gas branches 110, 120 and to the control unit 180. The determination of the first and second gas branch flows 153, 159 therefore comprises only a reading of the corresponding flows from the first and second gas flow signals 152, 158.

Furthermore, the anesthetic dispensing device 200 differs from the anesthetic dispensing device 100 shown in FIG. 1 in that an additional valve 265 is arranged in the first gas branch 110. The additional valve 265 is located behind the anesthetic evaporator 130 relative to the flow direction and is configured to receive an additional valve control signal 267 from the control unit 180 and to set an additional valve opening corresponding to the additional valve control signal 267. The additional valve 265 is a proportional valve in the exemplary embodiment shown. In one exemplary embodiment, not shown, it is an on-off valve, which is actuated in the pulse-pause mode. The additional valve opening describes the concrete position of the additional valve 265, i.e., a flow cross section of the breathing gas 104 flowing through the additional valve 265.

A highly accurate setting of the pressure ratios within the first and second gas branches 110, 120 can be made possible in an especially advantageous manner by the additional valve 265 in the exemplary embodiment shown. The anesthetic concentration at the outlet 142 can thus also be set especially precisely on the basis of the control of the anesthetic concentration at the outlet by means of the pressure ratios within the evaporator chamber 134. The setting of the pressure ratios within the evaporator chamber 134 comprises according to the present invention the setting of the absolute pressure of the breathing gas 104 being fed relative to the partial pressure of the anesthetic 132, which is given based on the temperature within the evaporator chamber 134.

Figure 3:
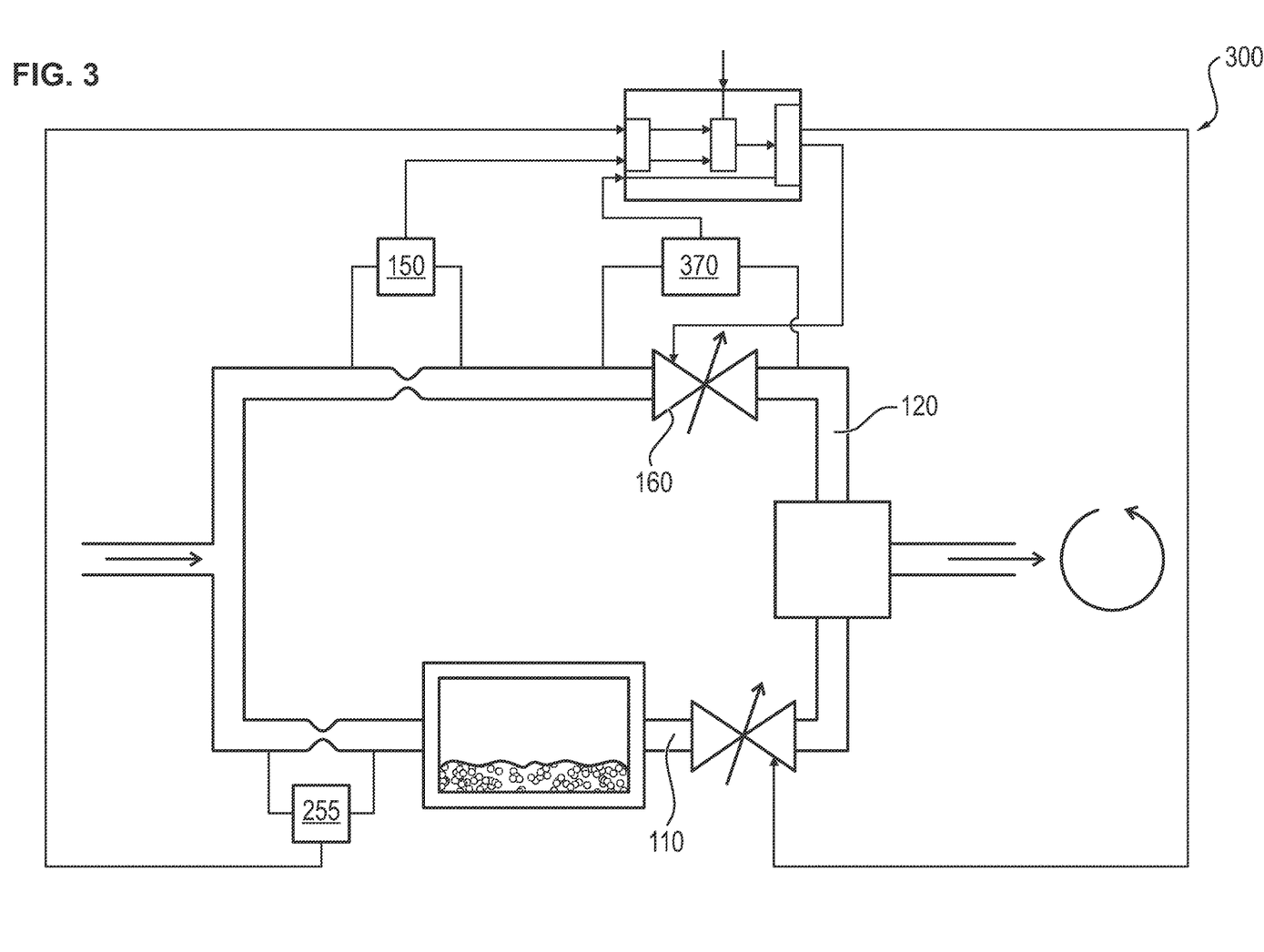
FIG. 3 is a schematic view of a third exemplary embodiment of the anesthetic dispensing device according to the present invention.

FIG. 3 shows a schematic view of a third exemplary embodiment of the anesthetic dispensing device 300 according to the present invention.

The anesthetic dispensing device 300 differs from the anesthetic dispensing device 200 shown in FIG. 2 in that the pressure measuring unit 370 is configured, furthermore, to measure the gas pressure within the second gas branch 120 behind the proportional valve 160 relative to the flow direction. The pressure difference made available via the proportional valve 160 within the second gas branch 120 can be measured and/or monitored especially precisely hereby.

In one advantageous exemplary embodiment, not shown, an additional pressure measuring unit is arranged in the area of the additional valve in the first gas branch. In a variant of this advantageous exemplary embodiment, the additional pressure measuring unit is also arranged behind the additional valve relative to the flow direction. so that the pressure difference provided by the additional valve can be measured and/or monitored especially precisely by means of this pressure measuring unit.

Finally, a structure of the respective first and second gas flow measuring units 150, 255, which are configured each as a differential pressure sensor, is shown, furthermore, within the framework of the exemplary embodiment shown in FIG. 3. A pressure is measured here in front of and behind a diaphragm, which contracts the respective gas branch 110, 120, and the gas flow within the respective gas branch 110, 120 is inferred thereby in the known manner. The exact mode of operation of a differential pressure sensor is known and it will not therefore be explained in more detail below.

Figure 4:
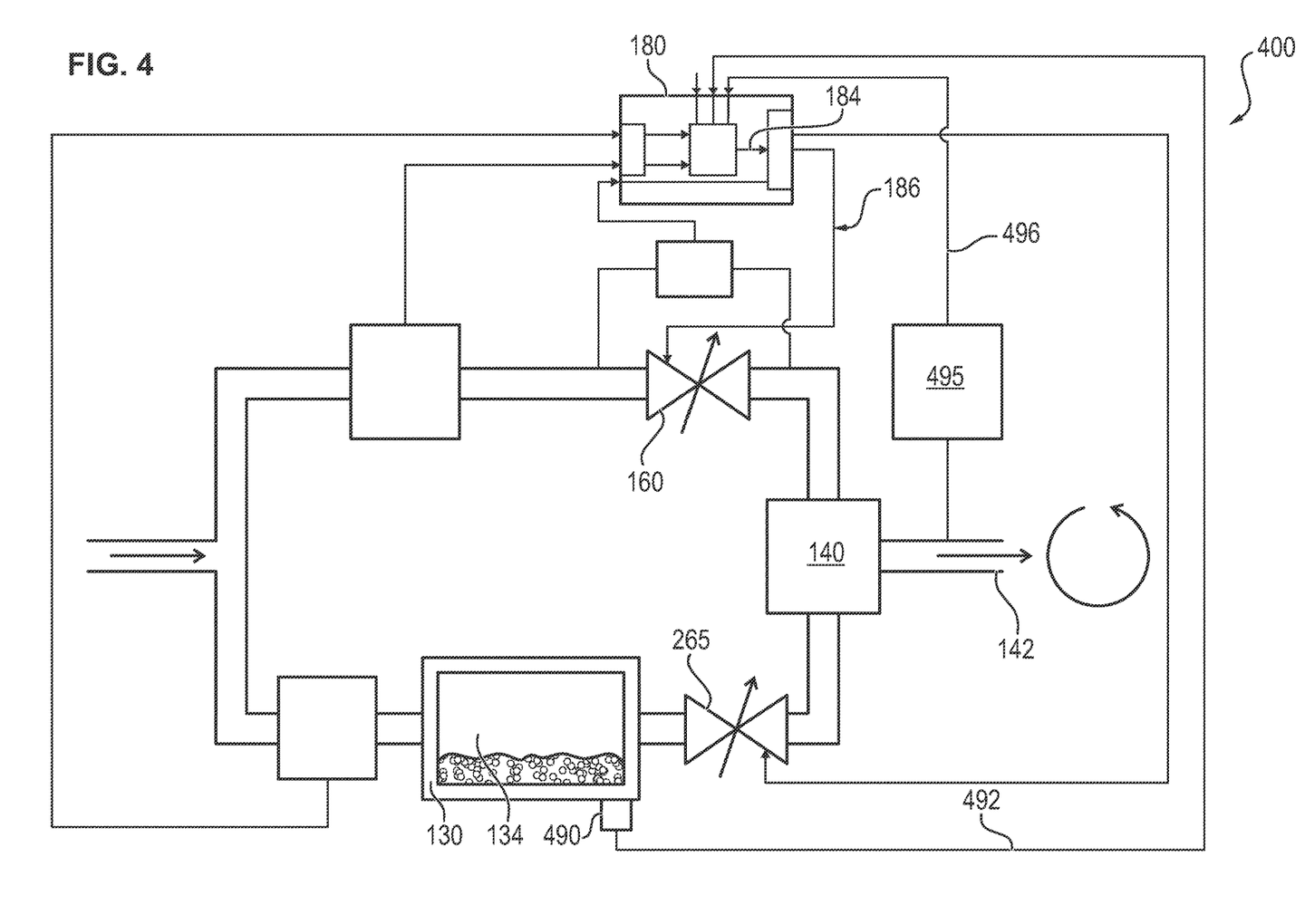
FIG. 4 is a schematic view of a fourth exemplary embodiment of the anesthetic dispensing device according to the present invention.

FIG. 4 shows a schematic view of a fourth exemplary embodiment of the anesthetic dispensing device 400 according to the present invention.

The anesthetic dispensing device 400 differs from the anesthetic dispensing device 300 shown in FIG. 3 in that a temperature measuring unit 490 is provided at the anesthetic evaporator 130, which temperature measuring unit 490 is configured to determine the currently present temperature within the evaporator chamber 134 and to output a temperature signal 492, which indicates this currently present temperature, to the control unit 180. The control unit 180 is configured, furthermore, in this exemplary embodiment to also determine the desired chamber pressure 184 on the basis of the temperature currently being present within the evaporator chamber 134.

The use of the temperature measuring unit 490 according to this exemplary embodiment is an especially preferred embodiment of the anesthetic dispensing device according to the present invention, because the thermodynamic conditions within the evaporator chamber 134 can be taken into consideration by the control unit 180 especially accurately during the determination of the desired chamber pressure 184. While a constant temperature is assumed within the evaporator chamber and/or a constant temperature is ensured within the evaporator chamber by external components of the anesthesia device in alternative exemplary embodiments, the temperature within the evaporator chamber 134 may also be variable in the anesthetic dispensing device 400. A change in the temperature within the evaporator chamber 134 ensures only a changed basis for the calculation within the control unit 180 for the calculation of the desired chamber pressure 184. The concrete calculation of suitable pressure ratios within the evaporator chamber 134 is based on prior-art thermodynamic laws and is therefore known to the person skilled in the art.

Furthermore, the anesthetic dispensing device 400 differs from the other anesthetic dispensing devices shown in that a concentration measuring unit 495, which is configured to determine a current concentration of the anesthetic in the area of the outlet 142 and to output a corresponding concentration signal, is arranged between the mixer unit 140 and the outlet 142. The control unit 180 is configured here, furthermore, to receive the concentration signal 496 and to determine the desired valve opening 186 as a function of the current concentration of the anesthetic indicated by the concentration signal 496 in the area of the outlet 142. The provision of the concentration measuring unit 495 makes it possible to check whether the concentration of the anesthetic at the outlet 142 does actually correspond to the predefined desired concentration corresponding to the desired concentration signal 182. In the exemplary embodiment shown, the control unit 180 is configured, furthermore, to determine the desired valve opening 186 as a function of a difference between the concentration currently present according to the concentration measuring unit 495 and the predefined desired concentration.

The anesthetic dispensing device being proposed is configured according to the present invention for the especially simple and reliable setting of the anesthetic concentration in a gas mixture to be made available to an anesthesia breathing circuit. In this exemplary embodiment, the concentration measuring unit 495 makes it additionally possible to regulate and/or to monitor the anesthetic concentration, because the influence of a change of the valve opening of the proportional valve 160 and of the additional valve 265 leads directly to a change in the anesthetic concentration at the outlet 142, which concentration is measured there by the concentration measuring unit 495. Thus, errors within the anesthetic dispensing device 400, for example, a leak, can be detected especially rapidly and/or a defective control can be corrected by the control unit 180 especially rapidly.

Figure 5:
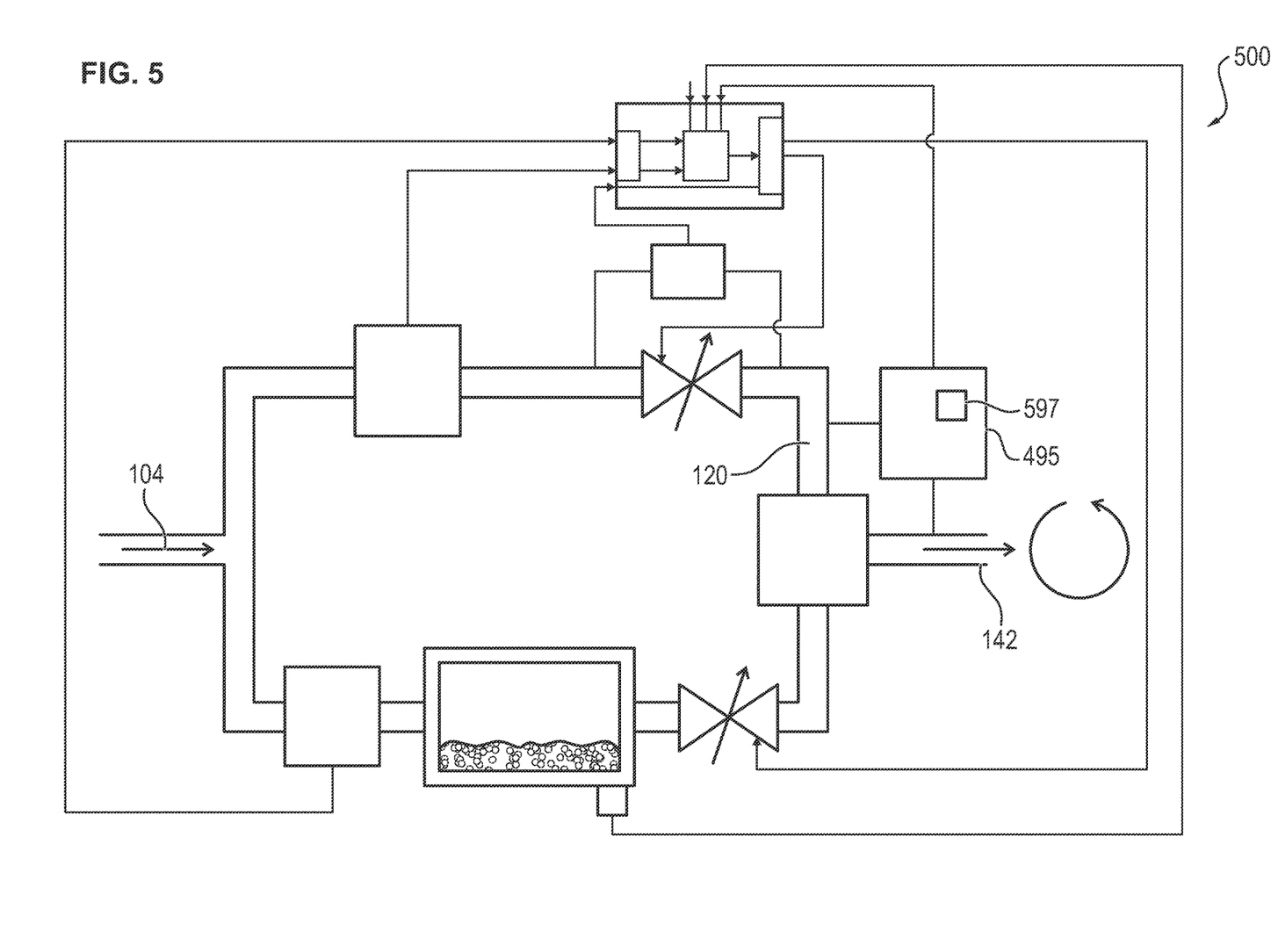
FIG. 5 is a schematic view of a fifth exemplary embodiment of the anesthetic dispensing device according to the present invention.

FIG. 5 shows a schematic view of a fifth exemplary embodiment of the anesthetic dispensing device 500 according to the present invention.

The anesthetic dispensing device 500 differs from the anesthetic dispensing device 400 shown in FIG. 4 in that the concentration measuring unit 495 has at least one concentration measuring module 597, which is configured to determine the concentration of the anesthetic in the gas mixture 108 in the area of the outlet 142 on the basis of a thermal conductivity measurement and/or of an electrochemical measurement.

A sensor suitable for the electrochemical al measurement of the concentration is typically a sensor that can specifically determine the concentration of the gas in question within a gas mixture.

A thermal conductivity sensor necessary for the thermal conductivity measurement is typically a sensor having an especially simple structure, which cannot directly determine a concentration of a gas within a gas mixture, because it outputs only a temperature value, which indicates a thermal conductivity of the gas being present. In the exemplary embodiment shown, the determination of the concentration by the thermal conductivity measurement is made possible by the concentration measuring unit 495 being pneumatically connected to both the outlet 142 and the second gas branch 120. As a result, the concentration measuring module 597 is arranged within the anesthetic dispensing device 500 such that it can carry out a thermal conductivity measurement in the area of the outlet 142 and in the second gas branch 120 simultaneously or at consecutive time intervals. The anesthetic concentration in the area of the outlet 142 can be determined by the comparison between two measured values, for example, thermal conductivities or temperature, by a corresponding calibration of the concentration measuring module 597. There is no anesthetic according to the present invention in the second gas branch 120, so that the difference between the measured values received within the second gas branch 120 and the gas mixture loaded with anesthetic in the area of the outlet 142 indicates this anesthetic concentration.

In one exemplary embodiment, not shown, the control unit is further configured to receive a fresh gas signal, which indicates a predefined fresh gas flow of the gas mixture, which fresh gas flow is to be made available at the outlet. The control unit is further configured in this exemplary embodiment, not shown, to determine the desired valve opening as a function of the predefined fresh gas flow. The predefined fresh gas flow is typically entered by a corresponding user input via a user interface and the corresponding fresh gas signal is made available through this user input.

In another exemplary embodiment, not shown, the anesthetic dispensing device has a user interface, wherein the user interface is configured to receive a user input pertaining to the desired concentration and to output the corresponding desired concentration signal to the control unit.

Figure 6:
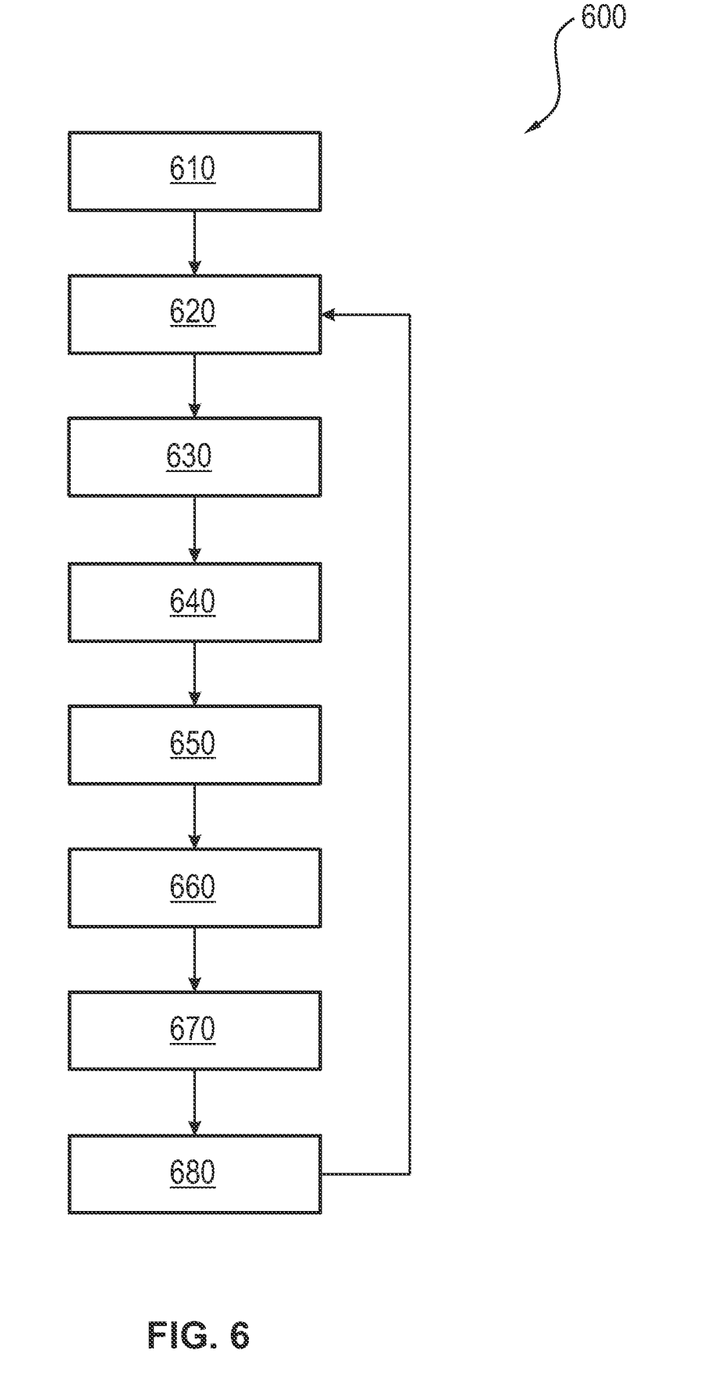
FIG. 6 is a flow chart of an exemplary embodiment of a process according to the other aspect of the present invention.

FIG. 6 shows a flow chart of an exemplary embodiment of a process 600 according to the other aspect of the present invention.

The process 600 according to the present invention for setting an anesthetic concentration in a gas mixture to be made available to an anesthesia breathing circuit has the steps described below.

A first step 610 comprises the provision of a first gas branch and of a second gas branch, wherein the first gas branch can be connected to a breathing gas feed and is configured to carry a breathing gas through an anesthetic evaporator to a mixer unit, and wherein the second gas branch can be connected to the breathing gas feed and is configured to carry the breathing gas directly to the mixer unit, and wherein the mixer unit is arranged and configured to mix the breathing gas from the first gas branch, which breathing gas is enriched with an anesthetic, with the breathing gas from the second gas branch, and to make the gas mixture formed thereby available to an outlet of the anesthetic dispensing device.

A next step 620 comprises a receipt of a valve control signal and a setting of a valve opening of a proportional valve corresponding to the valve control signal.

A next step 630 comprises a measurement of a first gas flow and an outputting of a corresponding first gas flow signal.

Another step 640 comprises a measurement of a gas pressure within the second gas branch in front of the proportional valve relative to the flow direction and an outputting of a corresponding valve pressure signal.

A next step 650 comprises a receipt of the first gas flow signal and of a second gas flow signal and a determination of a first gas branch flow in the first gas branch and of a second gas branch flow in the second gas branch as a function of the first gas flow signal and of the second gas flow signal.

Another step 660 comprises a receipt of a desired concentration signal, which indicates a predefined desired concentration of the anesthetic at the outlet, and a determination of a desired chamber pressure of an evaporator chamber of the anesthetic evaporator on the basis of the predefined desired concentration and of the first gas branch flow and of the second gas branch flow.

A next step 670 comprises a determination of a desired valve opening of the proportional valve as a function of the desired chamber pressure and of the valve pressure signal, wherein the desired valve opening is determined such that the desired chamber pressure within the anesthetic evaporator in the first gas branch is reached due to the desired valve opening of the proportional valve in the second gas branch.

A next step 680 comprises an outputting of the valve control signal indicating the desired valve opening to the proportional valve.

Step 610 is carried out preferably at the time of manufacture of the anesthetic dispensing device according to the present invention and is not repeated thereafter. Steps 630 and 640 may be carried out in a different order and are, in principle, independent from one another. Steps 650, 660, 670 and 680 are preferably carried out in this order. After step 680, the process is started again at step 620 with the respective newly outputted valve control signal. The process steps 620-680 are preferably carried out within a time interval that is shorter than 1 minute, especially shorter than 30 sec, and especially shorter than 10 sec.

In a preferred variant of this exemplary embodiment, step 630 of the process 600 being proposed has, furthermore, a measurement of a second gas flow and an outputting of the corresponding second gas flow signal. The second gas flow signal is advantageously made available in this variant dynamically within the framework of the process 600 according to the present invention rather than, for example, by external devices or by an especially constant presetting.

In another preferred exemplary embodiment, the process comprises, furthermore, the step of measuring a temperature within the evaporator chamber of the anesthetic evaporator and of outputting a corresponding temperature signal. Step 660 is complemented in this preferred exemplary embodiment by the determination of the desired chamber pressure being based, furthermore, on the measured current temperature within the evaporator chamber.

While specific embodiments of the invention have been shown and described in detail to illustrate the application of the principles of the invention, it will be understood that the invention may be embodied otherwise without departing from such principles.

LIST OF REFERENCE NUMBERS 100, 200, 300, 400, 500 Anesthetic dispensing device
104 Breathing gas
105 Anesthesia breathing circuit
108 Gas mixture
110 First gas branch
112 Breathing gas feed
120 Second gas branch
130 Anesthetic evaporator
132 Anesthetic
134 Evaporator chamber
140 Mixer unit
142 Outlet
150 First gas flow measuring unit
152 First gas flow signal
153 Second gas branch flow
158 Second gas flow signal
159 First gas branch flow
160 Proportional valve 162 Valve control signal
170, 370 Pressure measuring unit
172 Valve pressure signal
180 Control unit
182 Desired concentration signal
184 Desired chamber pressure
186 Desired valve opening
255 Second gas flow measuring unit
265 Additional valve
267 Additional valve control signal
490 Temperature sensor
492 Temperature signal
495 Concentration measuring unit
496 Concentration signal
597 Concentration measuring module
600 Process
610, 620, 630, 640, 650,
660, 670, 680 Process steps

What is claimed is:

1. An anesthetic dispensing device for setting an anesthetic concentration in a gas mixture to be made available to an anesthesia breathing circuit, the anesthetic dispensing device comprising:
a mixer unit;
an anesthetic evaporator with an evaporator chamber;
a first gas branch configured to be connected to a breathing gas feed and configured to carry a breathing gas through the anesthetic evaporator to the mixer unit;
a second gas branch configured to be connected to the breathing gas feed and configured to carry the breathing gas directly to the mixer unit, wherein: the anesthetic evaporator is arranged and configured to enrich the breathing gas in the first gas branch with an anesthetic; and the mixer unit is arranged and configured to mix the breathing gas from the first gas branch, which breathing gas is enriched with the anesthetic, with the breathing gas from the second gas branch and to make the gas mixture formed thereby available to an outlet of the anesthetic dispensing device;
a first gas flow measuring unit configured to measure a first gas branch flow and to output a corresponding first gas branch flow signal;
a proportional valve arranged connected in the second gas branch and configured to receive a valve control signal and to set a desired valve opening corresponding to the valve control signal;
a pressure measuring unit arranged and configured to measure a gas pressure within the second gas branch and to output a corresponding valve pressure signal; and
a control unit configured to receive the corresponding valve pressure signal, the corresponding first gas branch flow signal and a second gas branch flow signal and to determine a first gas branch flow in the first gas branch and a second gas branch flow in the second gas branch as a function of the first and second gas branch flow signals, wherein the control unit is further configured to receive a desired concentration signal, which indicates a predefined desired concentration of the anesthetic at the outlet, and to determine a desired chamber pressure of the evaporator chamber of the anesthetic evaporator based on the predefined desired concentration and the first and second gas branch flows, wherein the control unit is further configured to determine the desired valve opening of the proportional valve as a function of the desired chamber pressure and of the valve pressure signal, wherein the desired valve opening is determined such that the desired chamber pressure within the anesthetic evaporator in the first gas branch is reached due to the desired valve opening of the proportional valve, and wherein the control unit is further configured to output the valve control signal indicating the desired valve opening to the proportional valve.

2. The anesthetic dispensing device in accordance with claim 1, further comprising a second gas flow measuring unit configured to determine the second gas branch flow and to output the second gas flow signal based on the second gas branch flow.

3. The anesthetic dispensing device in accordance with claim 2, wherein the second gas flow measuring unit is arranged connected to the first gas branch and the first gas flow measuring unit is arranged connected to the second gas branch.

4. The anesthetic dispensing device in accordance with claim 2, wherein:
the first gas flow measuring unit comprises a differential pressure sensor; or
the second gas flow measuring unit comprises a differential pressure sensor; or
the first gas flow measuring unit comprises a differential pressure sensor and the second gas flow measuring unit comprises a differential pressure sensor.

5. The anesthetic dispensing device in accordance with claim 1, wherein the first gas flow measuring unit comprises a differential pressure sensor.

6. The anesthetic dispensing device in accordance with claim 1, wherein the pressure measuring unit is arranged connected at least partially in front of the proportional valve relative to a flow direction, the pressure measuring unit measuring the gas pressure within the second gas branch at a position located between the first gas flow measuring unit and the proportional valve.

7. The anesthetic dispensing device in accordance with claim 6, wherein the pressure measuring unit is further configured to measure the gas pressure within the second gas branch behind the proportional valve relative to the flow direction.

8. The anesthetic dispensing device in accordance with claim 1, further comprising an additional valve arranged in the first gas branch behind the anesthetic evaporator relative to a flow direction, the additional valve being configured to receive an additional valve control signal and to set an additional valve opening of the additional valve corresponding to the additional valve control signal.

9. The anesthetic dispensing device in accordance with claim 8, wherein the additional valve is an additional proportional valve.

10. The anesthetic dispensing device in accordance with claim 1, wherein the valve control signal is provided such that pressure in the evaporator chamber of the anesthetic evaporator does not fall below a predefined minimum pressure.

11. The anesthetic dispensing device in accordance with claim 1, further comprising a concentration measuring unit arranged between the mixer unit and the outlet, the concentration measuring unit being configured to determine a current concentration of the anesthetic and to output a corresponding concentration signal, wherein the control unit is further configured to receive the corresponding concentration signal and to determine the desired valve opening as a function of the desired chamber pressure, the valve pressure signal and the current concentration indicated by the corresponding concentration signal.

12. The anesthetic dispensing device in accordance with claim 11, wherein the concentration measuring unit has at least one concentration measuring module, which is configured to determine the current concentration of the anesthetic in the gas mixture based on a thermal conductivity measurement or based on an electrochemical measurement or based on the thermal conductivity measurement and the electrochemical measurement.

13. The anesthetic dispensing device in accordance with claim 11, wherein the control unit is further configured to determine the desired valve opening as a function of a difference between the current concentration and the predefined desired concentration.

14. The anesthetic dispensing device in accordance with claim 1, wherein:
 the anesthetic evaporator further comprises a temperature measuring unit, which is configured to determine a temperature within the evaporator chamber of the anesthetic evaporator and to output a temperature signal, which indicates the temperature present within the evaporator chamber; and
 the control unit is further configured to receive the temperature signal and to determine the desired chamber pressure as a function of the temperature signal and the predefined desired concentration and the first and second gas branch flows.

15. A process for setting an anesthetic concentration in a gas mixture to be made available to an anesthesia breathing circuit, the process comprising the steps of:
 providing a first gas branch and a second gas branch, wherein the first gas branch is connectable to a breathing gas feed and is configured to carry a breathing gas through an anesthetic evaporator to a mixer unit, and wherein the second gas branch is connectable to the breathing gas feed and is configured to carry the breathing gas directly to the mixer unit;
 arranging and configuring the mixer unit to mix the breathing gas from the first gas branch, which breathing gas is enriched with an anesthetic, with the breathing gas from the second gas branch and to make the gas mixture formed thereby available to an outlet of an anesthetic dispensing device;
 receiving a valve control signal and setting a desired valve opening of a proportional valve corresponding to the valve control signal;
 measuring a first gas branch flow and outputting a corresponding first gas branch flow signal;
 measuring a gas pressure within the second gas branch and outputting a corresponding valve pressure signal;
 receiving the corresponding first gas branch flow signal and a second gas branch flow signal and determining a first gas branch flow in the first gas branch and a second gas branch flow in the second gas branch as a function of the first and second gas branch flow signals;
 receiving a desired concentration signal, which indicates a predefined desired concentration of the anesthetic at the outlet and determining a desired chamber pressure of an evaporator chamber of the anesthetic evaporator based on the predefined desired concentration and the first and second gas branch flows;
 determining the desired valve opening of the proportional valve as a function of the desired chamber pressure and of the corresponding valve pressure signal, wherein a desired valve opening is determined such that the desired chamber pressure within the anesthetic evaporator is reached in the first gas branch due to the desired valve opening of the proportional valve in the second gas branch; and
 outputting the valve control signal indicating the desired valve opening to the proportional valve.

16. The process in accordance with claim 15, wherein a gas flow measuring unit is provided and configured to determine a second gas branch flow and to output the second gas branch flow signal based on the second gas branch flow.

17. The process in accordance with claim 16, wherein the gas flow measuring unit is arranged connected to the first gas branch and another gas flow measuring unit is arranged connected to the second gas branch, wherein the gas pressure is measured within the second gas branch at a position located between the another gas flow measuring unit and the proportional valve.

18. The process in accordance with claim 15, wherein an additional valve is arranged in the first gas branch behind the anesthetic evaporator relative to a flow direction, the additional valve being configured to receive an additional valve control signal and to set an additional valve opening of the additional valve corresponding to the additional valve control signal.

19. The process in accordance with claim 15, wherein a concentration measuring unit is arranged between the mixer unit and the outlet, the concentration measuring unit being configured to determine a current concentration of anesthetic and to output a corresponding concentration signal, wherein the control unit receives the corresponding concentration signal and determines the desired valve opening as a function of the current concentration indicated by the corresponding concentration signal, wherein the concentration measuring unit has at least one concentration measuring module, which determines the current concentration of the anesthetic in the gas mixture based on a thermal conductivity measurement or based on an electrochemical measurement or based on the thermal conductivity measurement and the electrochemical measurement.

20. The process in accordance with claim 15, wherein:
 the anesthetic evaporator is provided with a temperature measuring unit, which is configured to determine the temperature within the evaporator chamber of the anesthetic evaporator and to output a temperature signal, which indicates a temperature present within the evaporator chamber; and
 the control unit receives the temperature signal and determines the desired chamber pressure as a function of the temperature signal and the predefined desired concentration and the first and second gas branch flows.

* * * * *